United States Patent [19]
Gibbons et al.

[11] Patent Number: 5,947,644
[45] Date of Patent: Sep. 7, 1999

[54] CONSTRUCTION OF A FLUID IMPERMEABLE SUBTERRANEAN BARRIER WALL

[75] Inventors: David L. Gibbons, Littleton; George P. Southwell, Denver, both of Colo.

[73] Assignee: Marathon Oil Company, Findlay, Ohio

[21] Appl. No.: 09/054,621

[22] Filed: Apr. 3, 1998

[51] Int. Cl.⁶ ............................... E02D 5/18; E21B 33/13
[52] U.S. Cl. ......................... 405/267; 405/264; 405/266; 166/294; 523/130
[58] Field of Search ..................................... 405/128, 263, 405/264, 266, 267; 166/292, 293, 294, 295; 523/130, 131, 132; 524/398

[56] References Cited

U.S. PATENT DOCUMENTS

| | | | |
|---|---|---|---|
| 3,645,101 | 2/1972 | Sherard | 405/267 |
| 3,865,600 | 2/1975 | Pearson et al. | 106/84 |
| 3,884,861 | 5/1975 | Whitworth et al. | 523/131 |
| 3,919,849 | 11/1975 | Hessert et al. | 61/36 R |
| 4,083,407 | 4/1978 | Griffen, Jr. et al. | 166/291 |
| 4,094,150 | 6/1978 | Clarke | 405/264 |
| 4,280,560 | 7/1981 | Sydansk | 166/305.1 |
| 4,505,751 | 3/1985 | Sydansk | 166/292 |
| 4,537,918 | 8/1985 | Parcevaux et al. | 523/130 |
| 4,625,802 | 12/1986 | Sydansk | 166/292 |
| 4,683,949 | 8/1987 | Sydansk et al. | 166/270 |
| 4,706,754 | 11/1987 | Smith | 166/295 |
| 4,723,605 | 2/1988 | Sydansk | 166/295 |
| 4,730,675 | 3/1988 | Wygnat et al. | 166/295 |
| 4,770,245 | 9/1988 | Sydansk | 166/295 |
| 4,790,188 | 12/1988 | Castor | 405/128 |
| 4,790,688 | 12/1988 | Castor | 405/128 |
| 4,842,448 | 6/1989 | Koerner et al. | 405/258 |
| 4,928,766 | 5/1990 | Hoskin | 523/130 X |
| 4,957,166 | 9/1990 | Sydansk | 166/295 |
| 5,002,431 | 3/1991 | Heymans et al. | 405/128 |
| 5,028,344 | 7/1991 | Hoskin | 523/130 X |
| 5,120,344 | 6/1992 | Libor et al. | 71/27 |
| 5,131,469 | 7/1992 | Lockhart et al. | 166/295 |
| 5,143,958 | 9/1992 | Lockhart et al. | 524/219 |
| 5,219,475 | 6/1993 | Lockhart et al. | 252/8.551 |
| 5,219,476 | 6/1993 | Lockhart et al. | 252/8.551 |
| 5,268,397 | 12/1993 | Larson | 522/97 |
| 5,340,397 | 8/1994 | Brothers | 166/293 X |
| 5,345,034 | 9/1994 | Corey | 588/249 |
| 5,370,478 | 12/1994 | Bartlett et al. | 405/128 |
| 5,377,760 | 1/1995 | Merrill | 166/295 |
| 5,431,226 | 7/1995 | Sydansk | 166/295 |
| 5,447,197 | 9/1995 | Rae et al. | 166/293 |
| 5,608,137 | 3/1997 | Wilkins | 588/259 |
| 5,663,123 | 9/1997 | Goodhue, Jr. et al. | 507/225 |
| 5,701,956 | 12/1997 | Hardy et al. | 166/294 X |

OTHER PUBLICATIONS

Wilkins, E.S., "Polymer Gel as a Barrier for Ground Spill Containment", Abstract, 3rd U.S. DOE Petroleum Environmental Conference, Sep. 24, 1996.

Rocha, C.A., et al., "The Use of Gelled Polymer Technology for the Containment of Contaminated Groundwater" National Water Well Association–API "Petroleum Hydrocarbons Organic Chemistry Ground Water" Joint Conference, Nov. 9, 1988, pp. 479–497.

Lu, Y., et al., "A Polymer Gel Barrier for Oil Spill Containment", 2nd U.S. DOE Petroleum Environmental Conference, Sep. 25, 1995, pp. 675–687.

Wilkins, E., et al., "Development of Polymer Gel Barrier for Containment of Hazardous Waste", Journal of Environmental Science and Health, v. A29, No. 9, 1994, pp. 1829–1841.

Whitney, J.A., et al., "Method for Creating Fluid Impermeable Soil Barriers Using Polyacrylamide Gels" Marathon Oil Company Technical Disclosure Bulletin, v. XXX, Dec. 1990, p. 9.

*Primary Examiner*—David J. Bagnell
*Assistant Examiner*—Jong-Suk Lee
*Attorney, Agent, or Firm*—Jack L. Hummel; Jack E. Ebel

[57] ABSTRACT

A process is provided for constructing a fluid impermeable subterranean barrier wall in a permeable earthen material at an earthen surface. The process is initiated by excavating an earthen pit in the permeable earthen material. A gelable slurry is prepared including unconsolidated solids, an aqueous solvent, a crosslinkable polymer, and a polymer crosslinking agent. The unconsolidated solids have a bulk component consisting of a soil or a clay. The unconsolidated solids can also include a number of additive agents which enhance the performance of the gelable slurry, such as density control agents, mixing agents, permeability reduction agents, filtration control agents and strength loss reduction agents. The gelable slurry is placed in the earthen pit and gelled to substantial maturity. The resulting gel binds the unconsolidated solids present in the earthen pit to convert the gelable slurry to a gelled continuum of consolidated solids, which forms the fluid impermeable barrier wall in the earthen pit. In an alternate embodiment, a displaceable slurry formed from a liquid and unconsolidated solids is placed in the earthen pit ahead of the gelation solution. The gelation solution is subsequently placed in the earthen pit to displace at least a portion of the displaceable slurry. The gelation solution gels to substantial maturity in the earthen pit, binding the unconsolidated solids present in the earthen pit and forming the barrier wall.

33 Claims, No Drawings

CONSTRUCTION OF A FLUID IMPERMEABLE SUBTERRANEAN BARRIER WALL

TECHNICAL FIELD

The present invention relates to a process for constructing a subterranean barrier wall and, more particularly, to a process for constructing a fluid impermeable barrier wall in a permeable earthen material to substantially prevent fluid flow from one region of the earthen material to another.

BACKGROUND OF THE INVENTION

It is occasionally desirable to prevent the subsurface flow of fluid into or out of a given region of soil. For example, it may be desirable to fluid isolate a region of soil which has been contaminated with objectionable fluids to prevent the objectionable fluids from migrating into surrounding regions of uncontaminated soil. It may also be desirable to fluid isolate a region of soil to prevent ground water from flowing into the region of soil, for example, where the practitioner wishes to maintain the region of soil relatively dry.

A number of processes exist in the prior art which have fluid isolation of soil as a stated objective. One common approach of such prior art processes is to construct a subterranean barrier wall in the soil which is impermeable to fluid. However, known subterranean barrier wall construction processes exhibit limited degrees of effectiveness. Therefore, the present invention recognizes a need for an alternate subterranean barrier wall construction process to fluid isolate a region of soil, which is more effective than prior art processes. Accordingly, it is an object of the present invention to provide an effective process for fluid isolating a region of soil. More particularly, it is an object of the present invention to provide an effective process for fluid isolating a region of soil by constructing a fluid impermeable subterranean barrier wall adjacent to the region of soil. It is another object of the present invention to provide such a process, wherein the fluid impermeable subterranean barrier wall is relatively uncomplicated and cost-effective to construct. It is still another object of the present invention to provide such a process, wherein the fluid impermeable subterranean barrier wall is relatively strong and durable. These objects and others are achieved in accordance with the invention described hereafter.

SUMMARY OF THE INVENTION

The present invention is a process for constructing a fluid impermeable subterranean barrier wall in a permeable earthen material at an earthen surface. The process is initiated by excavating the permeable earthen material from the surface to form an earthen pit. The earthen pit is located such that a first region of the permeable earthen material is positioned on a first side of the earthen pit and a second region of the permeable earthen material is positioned on a second side of the earthen pit.

A gelable slurry is prepared including unconsolidated solids, an aqueous solvent, a crosslinkable polymer, and a polymer crosslinking agent. In accordance with one embodiment, the gelable slurry is prepared by mixing the aqueous solvent, crosslinkable polymer, and polymer crosslinking agent to form a gelation solution and mixing the resulting gelation solution with the unconsolidated solids. In accordance with an alternate embodiment, the gelable slurry is prepared by sequentially mixing the aqueous solvent, crosslinkable polymer, and polymer crosslinking agent with the unconsolidated solids.

In any case, the crosslinkable polymer is preferably an acrylamide polymer, and more preferably a polyacrylamide, a partially hydrolyzed polyacrylamide, or a mixture of both. The polymer crosslinking agent is preferably a complex containing a chromium III cation and a carboxylate anion. The preferred carboxylate anion is acetate, propionate, malonate, lactate, glycolate, or a mixture of these anions. The gelable slurry can also include a gelation rate accelerating agent or a gelation rate retarding agent to modify the gelation rate of the gelable slurry. The gelation rate accelerating agent is preferably a simple mineral acid, an inorganic chromium salt, or a mixture of these accelerators. The gelation rate retarding agent is preferably a carboxylic acid, an ammonium, potassium or sodium salt of the carboxylic acid, or a mixture of these retarders.

The unconsolidated solids have a bulk component consisting of a soil, a clay, or a mixture of these bulk components. The clay can be selected from among bentonite, attapulgite, smectite, montmorillonite, kaolinite, illite, and mixtures of these clays. The unconsolidated solids can also include a number of additive agents which enhance the performance of the gelable slurry. Preferred additive agents are density control agents, mixing agents, permeability reduction agents, filtration control agents, or strength loss reduction agents. Preferred density control agents include diatomaceous earth, gilsonite, perlite, hematite, ilemite, cellulose, sand, salt, lignin, and mixtures of these agents. Lignin is a preferred mixing agent. Preferred permeability reduction agents include perlite, gilsonite, and mixtures of these agents. Cellulose is a preferred filtration control agent. Silicas are preferred strength loss control agents.

The gelable slurry is placed in the earthen pit. Unconsolidated solids may also reside in the earthen pit which mix with the gelable slurry. The aqueous solvent, crosslinkable polymer and polymer crosslinking agent are gelled to substantial maturity in the earthen pit producing a gel. The gel binds the unconsolidated solids present in the earthen pit to convert the gelable slurry to a nondeformable gelled continuum of consolidated solids, which forms the barrier wall in the earthen pit. The barrier wall is substantially impermeable to fluid flowing from the first region toward the second region of the permeable earthen material.

The process of the present invention is practiced in accordance with an alternate embodiment, wherein a displaceable slurry is placed in the earthen pit ahead of the gelation solution. The displaceable slurry includes a liquid and unconsolidated solids, preferably a clay. Unconsolidated solids may also reside in the earthen pit. The gelation solution is prepared in a manner described above and placed in the earthen pit to displace at least a portion of the displaceable slurry from the earthen pit. The gelation solution gels to substantial maturity in the earthen pit, binding the unconsolidated solids present in the earthen pit to provide the barrier wall. In accordance with this embodiment, additional unconsolidated solids including additive agents can also be mixed with the gelation solution prior to placement of the gelation solution in the earthen pit.

The invention will be further understood from the accompanying description.

DESCRIPTION OF PREFERRED EMBODIMENTS

The present invention is a process for constructing a subterranean barrier wall which is substantially impermeable to fluid. The fluid impermeable barrier wall has utility for placement in a permeable earthen material at an earthen surface to substantially prevent fluid flow through the barrier wall from a region of the permeable earthen material on one side of the barrier wall to a region of the permeable earthen material on the other side of the barrier wall. More particularly, the fluid impermeable barrier wall has utility for placement in a soil to isolate a region of the soil on one side of the barrier wall from a fluid on the other side of the barrier wall. It is commonly desirable to isolate an uncontaminated soil region from a liquid contaminant, such as a liquid hydrocarbon, contained in an adjacent contaminated soil region. Alternatively, it can be desirable to isolate a soil region from a ground water, which may or may not have a liquid contaminant commingled with the ground water.

The process is initiated by excavating the permeable earthen material from the earthen surface to form an earthen pit. An earthen pit is generally defined herein as a cavity of substantially any configuration formed in the earthen surface which is open to the ambient atmosphere. The earthen pit is preferably configured as a ditch having a significantly greater dimension of length relative to its dimension of width and extending vertically in its dimension of depth substantially perpendicular to the earthen surface. A typical dimension of width is between about 0.1 and about 1 meters, while the dimension of length may be several orders of magnitude greater. A typical dimension of depth is on the order of several meters. The dimensions of the earthen pit are preferably sufficient to prevent a fluid flowing through the permeable earthen material in a substantially horizontal direction relative to the earthen surface from bypassing the earthen pit by migrating beneath or around the earthen pit. The earthen pit divides the earthen material into a first region, such as a contaminated region, positioned on a first side of the earthen pit and a second region, such as an uncontaminated region, positioned on a second side of the earthen pit. The first and second regions are frequently at about the same depth in the earthen material relative to the earthen surface.

A gelable slurry is prepared including unconsolidated solids, an aqueous solvent, a crosslinkable polymer, and a polymer crosslinking agent. In accordance with one embodiment, the gelable slurry is prepared by admixing the aqueous solvent, crosslinkable polymer, and polymer crosslinking agent to form a homogeneous liquid termed a gelation solution. The resulting liquid gelation solution is then mixed with the unconsolidated solids. The gelation solution is defined herein as a gel precursor transformable to a gel after being aged to maturity for a predetermined gel time. A gel is defined as a continuous three-dimensional crosslinked polymeric network integrating a liquid into the interstices of the network.

The preferred crosslinkable polymer having utility in the present invention is a water-soluble, carboxylate-containing, acrylamide polymer. An acrylamide polymer has one or more acrylamide groups and includes polyacrylamide (PA), partially hydrolyzed polyacrylamide (PHPA), copolymers of acrylamide and acrylate, and terpolymers and tetrapolymers of acrylamide. PA, as defined herein, has from about 0% to about 0.1% of its amide groups hydrolyzed. Although PA initially lacks a significant concentration of carboxylate groups, it is capable of auto-hydrolyzing under certain environmental conditions, thereby satisfying the definition of a carboxylate-containing polymer. PHPA has greater than about 0.1% of its amide groups hydrolyzed and less than 100% of its amide groups hydrolyzed. A preferred PHPA has less than about 50% of its amide groups hydrolyzed. The average molecular weight of an acrylamide polymer having utility herein is generally in a range between about 10,000 and about 50,000,000, and preferably between about 100,000 and about 10,000,000.

The polymer crosslinking agent having utility herein is a water-soluble complex containing a reactive transition metal cation and an organic carboxylate anion. The preferred transition metal cation is chromium III. Preferred carboxylate anions include mono-carboxylate anions, such as acetate and propionate, poly-carboxylate anions, such as malonate, and substituted derivatives of carboxylate anions, such as glycolate and lactate. The carboxylate anions are generally obtained from the corresponding acids or salts thereof. An example of a preferred crosslinking agent is one or more chromium III cations complexed with one or more acetate anions as taught by U.S. Pat. No. 4,683,949, incorporated herein by reference.

The aqueous solvent of the gelation solution is an aqueous liquid capable of forming a solution with the selected polymer and crosslinking agent. The term "solution" as used herein, in addition to true solutions, is intended to broadly encompass dispersions, emulsions, or any other homogeneous mixture of the crosslinkable polymer and polymer crosslinking agent in the aqueous solvent. The aqueous solvent is preferably a fresh water or a brine.

Admixing the crosslinkable polymer, polymer crosslinking agent, and aqueous solvent broadly encompasses batch mixing the components in bulk and subsequently utilizing the gelation solution as needed or mixing the components on the fly and utilizing the gelation solution substantially simultaneously upon mixing. The polymer and crosslinking agent can initially be in a solid or liquid state. If the crosslinking agent is added to the gelation solution as a chromium III-acetate complex, preferred forms of the chromium III-acetate complex crosslinking agent are solid $CrAc_3$, solid $CrAc_3 \cdot H_2O$, solid $Cr_3Ac_7(OH)_2$ or a solution labeled "Chromic Acetate 50% Solution" that is commercially available from McGean-Rohco Chemical Co., Inc., 50 Public Square, No. 1250, Cleveland, Ohio 44113-2251, U.S.A.

The polymer concentration of the resulting gelation solution is generally at least about 500 ppm, preferably at least about 2,000 ppm, and most preferably within a range between about 3,000 ppm and about 100,000 ppm. The crosslinking agent concentration of the gelation solution is generally between about 44 ppm and about 88,000 ppm, and preferably between about 88 ppm and about 18,000 ppm. As such, the corresponding chromium III cation concentration of the gelation solution is generally between about 10 ppm and about 20,000 ppm, and preferably between about 20 ppm and about 4,000 ppm. The weight ratio of polymer to crosslinking agent in the gelation solution is preferably between about 3:1 and about 15:1.

In accordance with an alternate embodiment, the gelable slurry is prepared by sequentially mixing the aqueous solvent, crosslinkable polymer, and polymer crosslinking agent in the relative concentration ranges recited above with the unconsolidated solids. Sequential mixing encompasses premixing any two components from among the solvent, polymer and crosslinking agent, mixing the resulting premixture with the unconsolidated solids, and mixing the remaining component with the unconsolidated solids, either before or after mixing the premixture with the unconsolidated solids. Sequential mixing also encompasses mixing the solvent, polymer and crosslinking agent components individually with the unconsolidated solids in substantially any order.

In accordance with either of the above-recited embodiments, a gelation rate controlling agent can optionally be included in the gelable slurry. The gelation rate controlling agent is defined herein as a material mixed into the gelation solution that substantially retards or accelerates the rate of the gelation reaction, preferably without substantially modifying the strength and integrity of the resulting gel. In some cases within the practice of the present invention, it may be desirable to retard the rate of gelation. Gelation rate retarding agents having utility herein include carboxylic acids taught by U.S. Pat. Nos. 4,706,754; 5,131,469; 5,143,958; 5,219,475; and 5,219,476, incorporated herein by reference. Such carboxylic acids include acetic acid, propionic acid, lactic acid, malonic acid and glycolic acid. Other gelation rate retarding agents having utility herein include the carboxylate salts of the above-recited carboxylic acids, including ammonium, potassium or sodium salts of acetate, propionate, lactate, malonate or glycolate. Alternatively, retarded gelation may be achieved without including a gelation rate retarding agent in the gelation solution by appropriate selection of a decarboxylated crosslinking agent in the manner of U.S. Pat. No. 5,431,226, incorporated herein by reference.

In other cases within the practice of the present invention, it may be desirable to accelerate the rate of gelation. Accelerated gelation may be achieved by including a gelation rate accelerating agent in the gelation solution. Gelation rate accelerating agents having utility herein include simple mineral acids and inorganic chromic salts taught by U.S. Pat. Nos. 4,72:3,605 and 4,770,245, respectively, incorporated herein by reference. Such simple mineral acids include hydrochloric acid, nitric acid, sulfuric acid, and the like. Such inorganic chromic salts include chromic trichloride, chromic triiodide, chromic tribromide, chromic triperchlorate, chromic trinitrate, and the like. Alternatively, accelerated gelation may be achieved without including a gelation rate accelerating agent in the gelation solution by appropriate selection of a crosslinking agent having a more rapid rate of reaction and/or by increasing the concentration of the selected crosslinking agent in the gelation solution.

The major component of the unconsolidated solids employed in the gelable slurry is a bulk component. The bulk component makes up between at least about 50% and 100% by weight of the unconsolidated solids in the gelable slurry. The bulk component is a soil, a clay, or a soil and clay mixture. The soil is typically obtained by excavation from the earthen pit, while clays having utility herein include bentonite, attapulgite, smectite, montmorillonite, kaolinite, illite, and mixtures of these clays. The bulk component is characterized as being substantially inert with respect to the solvent, polymer and crosslinking agent.

The remainder of the unconsolidated solids consists of any number of additive agents which enhance the performance of the gelable slurry. Preferred additive agents are density control agents, mixing agents, permeability reduction agents, filtration control agents, or strength loss reduction agents. Preferred density control agents include diatomaceous earth, gilsonite, perlite, hematite, ilemite, cellulose, sand, salt, lignin, and mixtures of these agents. Lignin is a preferred mixing agent. Preferred permeability reduction agents include perlite, gilsonite, and mixtures of these agents. Cellulose is a preferred filtration control agent. Silicas are preferred strength loss control agents.

Upon preparation, the gelable slurry is placed in the earthen pit. Unconsolidated solids may also reside in the earthen pit, either having been retained in the earthen pit during the excavation step or having been deposited in the earthen pit after the excavation step. The unconsolidated solids residing in the earthen pit preferably mix with the gelable slurry as it is placed in the earthen pit. The volumetric ratio of aqueous solvent, crosslinkable polymer and polymer crosslinking agent to total unconsolidated solids in the gelable slurry is preferably between about 20:1 and about 1:20. A sufficient volume of the gelable slurry is placed in the earthen pit to preferably substantially fill the earthen pit to a level even with the earthen surface. As such, the gelable slurry substantially continuously contacts the entire surface wall of the earthen pit.

The solvent, polymer and crosslinking agent of the gelable slurry are gelled to substantial maturity in the earthen pit producing a stable gel. Gelling of the solvent, polymer and crosslinking agent to maturity is a consequence of substantially complete crosslinking between the polymer and crosslinking agent. Crosslinking is completed when either substantially all of the reactable crosslinking agent or substantially all of the polymer crosslinking sites are consumed during aging of the gelable slurry. A "stable gel" is characterized herein as a gel that does not exhibit substantial loss of structure over time as evidenced by reduction in gel strength or expulsion of water, termed network breakdown and/or syneresis. Crosslinking between appropriate sites of the same or different polymer molecules creates the network structure of the stable gel. The terms "crosslinking", "gelling" and "gelation" are used synonymously herein. Partial crosslinking of the polymer by the crosslinking agent may occur before the gelable slurry is placed in the earthen pit, but substantial crosslinking resulting in gel formation preferably does not occur until at least a substantial portion of the gelable slurry is placed. Retarding the rate of gelation can enable sufficient time for deployment of the gelable slurry before formation of the gel. Alternatively, accelerating the rate of gelation can reduce the time required for complete gelation after the gelable slurry is placed.

The gel serves as a binder, consolidating the particles of the unconsolidated solids by binding them to one another. Accordingly, the gel transforms the gelable slurry into a gelled continuum of consolidated solids, which forms the barrier wall in the earthen pit. In general, a lower concentration of consolidated solids in the gelable slurry preferentially dictates selection of a gel having a relatively higher degree of structure. The degree of structure of the gel formulated in the manner of the present invention is inter alia a function of the polymer properties, the polymer concentration, and the degree and character of crosslinking in the gelable slurry. The degree of structure of a gel containing an acrylamide polymer is usually increased by increasing the polymer concentration in the gelable slurry. However, an oftentimes more cost-effective and preferred means for achieving the same effect is to employ a higher molecular weight polymer at a relatively fixed concentration and initial hydrolysis level. Conversely, a reduction in the degree of structure is achieved by using a lower molecular weight polymer. Thus, the skilled practitioner can modify the degree of structure of the present gel in the above-described manner to correspond with the desired characteristics of the barrier wall. In any case, the gel preferably has sufficient structure such that the barrier wall is substantially rigid or nondeformable, retaining its form if the surrounding permeable earthen material making up the wall of the earthen pit is removed.

As with the gelable slurry, the barrier wall resulting therefrom substantially fills the earthen pit, substantially continuously contacting the entire surface wall of the earthen pit. The barrier wall has sufficient strength to resist propagation from the earthen pit when exposed to fluids flowing through the permeable earthen material or flowing atop the barrier wall. It is also noted that the gel retains its stability and relatively high structural strength in the presence of fluid contaminants, ground water, sunlight, rain and other atmospheric weather conditions. Accordingly, the barrier wall remains substantially impermeable to fluid flowing from the first region toward the second region of the permeable earthen material for an extended time period of many years, corresponding to the useful life of the barrier wall. The barrier wall is particularly applicable to blocking fluid flowing through the permeable earthen material in a substantially horizontal direction relative to the earthen surface.

The process of the present invention is practiced in accordance with an alternate embodiment, wherein a displaceable slurry is placed in the earthen pit ahead of the gelation solution. The displaceable slurry includes a liquid and unconsolidated solids. The liquid is preferably water and the unconsolidated solids are preferably a clay selected from among the above-recited clays. The displaceable slurry may be limited to these two components or may also include one or more of the above-recited additive agents. A sufficient volume of the displaceable slurry is placed in the earthen pit to preferably substantially fill the earthen pit to a level even with the earthen surface, thereby substantially continuously contacting the entire surface wall of the earthen pit. Unconsolidated solids may also reside in the earthen pit, either having been retained in the earthen pit during the excavation step or having been deposited in the earthen pit after the excavation step. The unconsolidated solids residing in the earthen pit preferably mix with the displaceable slurry as it is placed in the earthen pit. The volumetric ratio of the liquid to total unconsolidated solids in the displacable slurry is preferably between about 20:1 and about 1:20.

The gelation solution is prepared in a manner described above and placed in the earthen pit to displace at least a portion, if not all, of the displaceable slurry from the earthen pit. The gelation solution gels to substantial maturity in the earthen pit, binding the unconsolidated solids present in the earthen pit to provide the barrier wall. In accordance with this embodiment, additional unconsolidated solids including additive agents can be mixed with the gelation solution prior to placement of the gelation solution in the earthen pit.

The following examples demonstrate the scope and utility of the present invention, but are not to be construed as limiting the scope thereof.

EXAMPLE 1

A quantity of unconsolidated solids comprising a mixture of soil and bentonite clay is prepared by combining 5 grams of bentonite clay with 95 grams of soil. A gelation solution is prepared by combining 40.0 grams of a crosslinkable polymer solution, 0.1778 grams of a crosslinking agent solution and 59.82 grams of an aqueous solvent. The crosslinkable polymer solution is 2.0 weight percent active in PHPA, which has an approximate molecular weight of 5,000,000. The crosslinking agent solution is 50 weight percent active in chromium III-acetate complex. 10.0 cc of the gelation solution are mixed with 8.5 cc of the unconsolidated solids to form a gelable slurry. The gelable slurry is spread onto a watch glass and exposed to ambient room conditions for 72 hours. During this time a gel is formed which does not flow under the force of gravity, thereby converting the gelable slurry to a nondeformable gelled continuum of consolidated solids which is substantially impermeable to fluid.

EXAMPLE 2

The procedure of Example 1 is repeated except that the gelation solution comprises 60.0 grams of the crosslinkable polymer solution, 0.20 grams of the crosslinking agent solution and 39.8 grams of the aqueous solvent. 10.0 cc of the gelation solution are mixed with 8.5 cc of the unconsolidated solids to form the gelable slurry, which is spread onto the watch glass and exposed to ambient room conditions for 72 hours. During this time a nonflowing gel is formed, thereby converting the gelable slurry to a nondeformable gelled continuum of consolidated solids which is substantially impermeable to fluid. It is rioted that the gel of Example 2 is somewhat more structured than that of Example 1.

EXAMPLE 3

The procedure of Example 1 is repeated except that the gelation solution comprises 90.91 grams of the crosslinkable polymer solution, 1.0 grams of the crosslinking agent solution and 8.091 grams of the aqueous solvent. The crosslinkable polymer solution is 5.5 weight percent active in a PHPA, which has an approximate molecular weight of 500,000. 10.0 cc of the gelation solution are mixed with 10.0 cc of the unconsolidated solids to form the gelable slurry, which is spread onto the watch glass and exposed to ambient room conditions for 72 hours. During this time a rigid gel is formed, thereby converting the gelable slurry to a nondeformable gelled continuum of consolidated solids which is substantially impermeable to fluid. It is noted that the gel of Example 3 is more structured than those of Examples 1 and 2.

EXAMPLE 4

A gelable slurry is prepared by adding 6.0 weight percent bentonite clay and 0.5 weight percent sodium chloride to an aqueous solvent. 49.8 grams of the resulting mixture are then combined with 50.0 grams of a crosslinkable polymer solution and 0.200 grams of a crosslinking agent solution. The crosslinkable polymer solution is 2.0 weight percent active in a PHPA, which has an approximate molecular weight of 5,000,000. The crosslinking agent solution is 50 weight percent active in chromium III-acetate complex. The gelable slurry is spread onto a watch glass and exposed to ambient room conditions for 24 hours. During this time a slightly flowing gel is formed, converting the gelable slurry to a nondeformable gelled continuum of consolidated solids which is substantially impermeable to fluid. It is noted that the gel of Example 4 is somewhat less structured than that of Example 1.

The present invention has been described above in each of its embodiments as a process for construction of a single barrier wall to effect fluid isolation between two adjacent regions of permeable earthen material. It is further within the scope of the present invention to practice each of the above-described embodiments as a process for construction of a system barrier walls around a region of permeable earthen material to effect fluid isolation of the region from a plurality of surrounding regions of permeable earthen material.

While the foregoing preferred embodiments of the invention have been described and shown, it is understood that alternatives and modifications, such as those suggested and others, may be made thereto and fall within the scope of the present invention.

We claim:

1. A process for constructing a subterranean barrier wall comprising:

preparing a gelable slurry including unconsolidated solids, an aqueous solvent, an acrylamide polymer, and a complex containing a chromium III cation and a carboxylate anion;

placing said gelable slurry in an earthen pit, wherein a first region of a permeable earthen material is positioned on a first side of said earthen pit and a second region of said permeable earthen material is positioned on a second side of said earthen pit;

gelling said aqueous solvent, said acrylamide polymer and said complex to substantial maturity in said earthen pit producing a gel; and binding said unconsolidated solids with said gel to convert said gelable slurry to a gelled continuum of consolidated solids forming a barrier wall in said earthen pit, wherein said barrier wall is substantially impermeable to fluid flowing from said first region toward said second region.

2. The process of claim 1 further comprising excavating said permeable earthen material from an earthen surface to form said earthen pit.

3. The process of claim 1 wherein said gelable slurry includes a gelation rate accelerating agent selected from a group consisting of simple mineral acids, inorganic chromium salts, and mixtures thereof.

4. The process of claim 1 wherein said gelable slurry includes a gelation rate retarding agent selected from a group consisting of carboxylic acids, ammonium, potassium or sodium salts of said carboxylic acids, and mixtures thereof.

5. The process of claim 1 wherein said unconsolidated solids include a bulk component selected from a group consisting of a soil, a clay, and mixtures thereof.

6. The process of claim 5 wherein said clay is selected from a group consisting of bentonite, attapulgite, smectite, montmorillonite, kaolinite, illite, and mixtures thereof.

7. The process of claim 5 wherein said unconsolidated solids include a density control agent selected from a group consisting of diatomaceous earth, gilsonite, perlite, hematite, ilemite, cellulose, sand, salt, lignin, and mixtures thereof.

8. The process of claim 5 wherein said unconsolidated solids include lignin as a mixing agent or density control agent.

9. The process of claim 5 wherein said unconsolidated solids include cellulose as a filtration control agent.

10. The process of claim 5 wherein said unconsolidated solids include a permeability reduction agent selected from a group consisting of perlite, gilsonite, and mixtures thereof.

11. The process of claim 5 wherein said unconsolidated solids include a silica as a strength loss reduction agent.

12. The process of claim 1 wherein said carboxylate anion is selected from a group consisting of acetate, propionate, malonate, lactate, glycolate, and mixtures thereof.

13. The process of claim 1 wherein said acrylamide polymer is selected from a group consisting of polyacrylamide, partially hydrolyzed polyacrylamide and mixtures thereof.

14. The process of claim 1 wherein said gelable slurry is prepared by mixing said aqueous solvent, said acrylamide polymer, and said complex to form a gelation solution and mixing said gelation solution with said unconsolidated solids.

15. The process of claim 1 wherein said gelable slurry is prepared by sequentially mixing said aqueous solvent, said acrylamide polymer, and said complex with said unconsolidated solids.

16. The process of claim 1 further comprising mixing said gelable slurry with unconsolidated solids residing in said earthen pit.

17. A process for constructing a subterranean barrier wall comprising:

placing a displaceable slurry in an earthen pit, wherein said displaceable slurry includes a liquid and unconsolidated solids, and wherein a first region of a permeable earthen material is positioned on a first side of said earthen pit and a second region of said permeable earthen material is positioned on a second side of said earthen pit;

preparing a gelation solution including an aqueous solvent, an acrylamide polymer, and a complex containing a chromium III cation and a carboxylate anion;

placing said gelation solution in said earthen pit to displace at least a portion of said displaceable slurry from said earthen pit;

gelling said gelation solution to substantial maturity in said earthen pit producing a gel; and binding said unconsolidated solids with said gel to form a gelled continuum of consolidated solids providing a barrier wall in said earthen pit, wherein said barrier wall is substantially impermeable to fluid flowing from said first region toward said second region.

18. The process of claim 17 further comprising mixing additional unconsolidated solids with said gelation solution prior to placement of said gelation solution in said earthen pit.

19. The process of claim 17 further comprising excavating said permeable earthen material from an earthen surface to form said earthen pit.

20. The process of claim 17 wherein said gelation solution includes a gelation rate accelerating agent selected from a group consisting of simple mineral acids, inorganic chromium salts, and mixtures thereof.

21. The process of claim 17 wherein said gelation solution includes a gelation rate retarding agent selected from a group consisting of carboxylic acids, ammonium, potassium or sodium salts of said carboxylic acids, and mixtures thereof.

22. The process of claim 17 wherein said unconsolidated solids are a clay.

23. The process of claim 22 wherein said clay is selected from a group consisting of bentonite, attapulgite, smectite, montmorillonite, kaolinite, illite, and mixtures thereof.

24. The process of claim 18 wherein said additional unconsolidated solids include a bulk component selected from a group consisting of a soil, a clay, and mixtures thereof.

25. The process of claim 24 wherein said clay is selected from a group consisting of bentonite, attapulgite, smectite, montmorillonite, kaolinite, illite, and mixtures thereof.

26. The process of claim 24 wherein said additional unconsolidated solids include a density control agent selected from a group consisting of diatomaceous earth, gilsonite, perlite, hematite, ilemite, cellulose, sand, salt, lignin, and mixtures thereof.

27. The process of claim 24 wherein said additional unconsolidated solids include lignin as a mixing agent or density control agent.

28. The process of claim 24 wherein said additional unconsolidated solids include cellulose as a filtration control agent.

29. The process of claim 24 wherein said additional unconsolidated solids include a permeability reduction agent selected from a group consisting of perlite, gilsonite, and mixtures thereof.

30. The process of claim 24 wherein said additional unconsolidated solids include a silica as a strength loss reduction agent.

31. The process of claim 17 wherein said carboxylate anion is selected from a group consisting of acetate, propionate, malonate, lactate, glycolate, and mixtures thereof.

32. The process of claim 17 wherein said acrylamide polymer is selected from a group consisting of polyacrylamide, partially hydrolyzed polyacrylamide and mixtures thereof.

33. The process of claim 17 further comprising mixing said displaceable slurry with unconsolidated solids residing in said earthen pit.

* * * * *